United States Patent
Cleaver et al.

(10) Patent No.: US 9,294,420 B2
(45) Date of Patent: Mar. 22, 2016

(54) AUGMENTING A REAL-TIME COLLABORATION WITH RANKED ELECTRONIC BULLETIN BOARD POSTS

(71) Applicant: International Business Machines Corporation, Armonk, NY (US)

(72) Inventors: Liam J. Cleaver, Alexandria, VA (US); Kristine A. Lawas, Ridgewood, NJ (US); Richard E. Nesbitt, Holly Springs, NC (US); Brian M. O'Connell, Research Triangle Park, NC (US); Kevin E. Vaughan, Fuquay Varina, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/337,402

(22) Filed: Jul. 22, 2014

(65) Prior Publication Data
US 2014/0330909 A1 Nov. 6, 2014

Related U.S. Application Data

(63) Continuation of application No. 13/305,819, filed on Nov. 29, 2011, now Pat. No. 8,812,527.

(51) Int. Cl.
*G06F 17/30* (2006.01)
*H04L 12/58* (2006.01)
(Continued)

(52) U.S. Cl.
CPC ............. *H04L 51/04* (2013.01); *G06Q 10/101* (2013.01); *G06Q 50/01* (2013.01)

(58) Field of Classification Search
CPC ........ G06Q 10/10; G06Q 50/01; H04L 51/16; H04L 51/04; H04L 51/32; H04L 65/403; G06F 17/30598; G06F 17/30867

USPC .......... 707/723, 737, 748; 709/204; 715/753, 715/758; 705/319
See application file for complete search history.

(56) References Cited

U.S. PATENT DOCUMENTS

| 6,346,952 B1 | 2/2002 | Shtivelman |
| 6,606,644 B1 | 8/2003 | Ford et al. |

(Continued)

FOREIGN PATENT DOCUMENTS

| CN | 1983252 | 6/2007 |
| CN | 101079784 | 11/2007 |

(Continued)

OTHER PUBLICATIONS

IBM, Thread Selection Method for Marking Threads and Mini-Threads in Chat and Instant Message Sessions; IP.com; Prior ARt Database Technical Disclosure; IP.com No. IPCOM000179749D; Feb. 25, 2009; 5 pages.

(Continued)

*Primary Examiner* — Dennis Truong
(74) *Attorney, Agent, or Firm* — Schmeiser, Olsen & Watts; William H. Hartwell

(57) ABSTRACT

An approach for augmenting a current instant message (IM) session is presented. The subjects of the first and second posts of electronic bulletin boards are determined to be similar to the text dialog of the IM session. The first post is determined to be from a first user who previously collaborated with a participant of the text dialog. The second post is determined to be from a second user who has not collaborated with the participant. Based in part on the first post being from the first user who previously collaborated with the participant and the second post being from the second user who has not collaborated with the participant, a first hyperlink to the first post is displayed relative to a second hyperlink to the second post to indicate the first post is ranked higher in relevance to the current IM session than the second post.

17 Claims, 5 Drawing Sheets

(51) Int. Cl.
*G06Q 10/10* (2012.01)
*G06Q 50/00* (2012.01)

(56) References Cited

U.S. PATENT DOCUMENTS

| | | |
|---|---|---|
| 7,305,436 B2 | 12/2007 | Willis |
| 7,376,893 B2 | 5/2008 | Chen et al. |
| 7,734,631 B2 | 6/2010 | Richardson et al. |
| 7,904,515 B2 * | 3/2011 | Ambati ............... G06Q 10/10 709/205 |
| 8,010,524 B2 | 8/2011 | Chen et al. |
| 8,271,583 B2 | 9/2012 | Stolorz et al. |
| 8,484,216 B2 * | 7/2013 | Berry et al. ............. 707/737 |
| 8,683,355 B1 * | 3/2014 | Gailloux ............. H04L 51/10 709/204 |
| 8,812,527 B2 | 8/2014 | Cleaver et al. |
| 2005/0198128 A1 * | 9/2005 | Anderson ............ G06F 17/24 709/204 |
| 2005/0234739 A1 | 10/2005 | Schoenberg |
| 2006/0026593 A1 * | 2/2006 | Canning et al. ............ 718/100 |
| 2006/0080432 A1 | 4/2006 | Spataro et al. |
| 2006/0235969 A1 | 10/2006 | Dugan |
| 2007/0078675 A1 * | 4/2007 | Kaplan ............... 705/1 |
| 2007/0271340 A1 | 11/2007 | Goodman et al. |
| 2008/0114737 A1 | 5/2008 | Neely et al. |
| 2008/0201434 A1 | 8/2008 | Holmes et al. |
| 2008/0244438 A1 * | 10/2008 | Peters et al. ............ 715/772 |
| 2009/0089678 A1 | 4/2009 | Sacco et al. |
| 2009/0119275 A1 | 5/2009 | Chen et al. |
| 2009/0254618 A1 | 10/2009 | Arnold et al. |
| 2009/0292660 A1 | 11/2009 | Behal et al. |
| 2010/0145940 A1 | 6/2010 | Chen et al. |
| 2010/0205541 A1 * | 8/2010 | Rapaport et al. ......... 715/753 |
| 2010/0268597 A1 | 10/2010 | Bookstaff |
| 2011/0161270 A1 * | 6/2011 | Arnett et al. ............ 706/46 |
| 2012/0191779 A1 * | 7/2012 | Mandel et al. ........... 709/204 |
| 2012/0215773 A1 * | 8/2012 | Si et al. ............... 707/723 |
| 2012/0290950 A1 * | 11/2012 | Rapaport et al. ......... 715/753 |
| 2013/0138671 A1 | 5/2013 | Cleaver et al. |

FOREIGN PATENT DOCUMENTS

| | | | |
|---|---|---|---|
| CN | 101176052 | 5/2008 | |
| CN | 101331484 | 12/2008 | |
| CN | 101794291 | 8/2010 | |
| WO | 0180214 | 10/2001 | |
| WO | 02101483 | 12/2002 | |
| WO | WO 2011050495 A1 * | 5/2011 | ............ 707/723 |

OTHER PUBLICATIONS

Method and System for Marking Chat Segments Based on Predefined Keywords in an Instant Messaging (IM) Application; IP.com Prior Art Database Technical Disclosure; IP.com No. IPCOM000195325D; Apr. 29, 2010; 6 pages.

Office Action (Mail date Oct. 10, 2012) for U.S. Appl. No. 13/305,819, filed Nov. 29, 2011.

Amendment filed Jan. 14, 2013 in response to Office Action (Mail Date Oct. 10, 2012) for U.S. Appl. No. 13/305,819, filed Nov. 29, 2011.

Final Office Action (Mail Date Mar. 19, 2013) for U.S. Appl. No. 13/305,819, filed Nov. 29, 2011.

Amendment and Request for Continued Examination filed Jun. 19, 2014 in response to Final Office Action (Mail Date Mar. 19, 2013) for U.S. Appl. No. 13/305,819, filed Nov. 29, 2011.

Notice of Allowance (Mail Date Apr. 8, 2014) for U.S. Appl. No. 13/305,819, filed Nov. 29, 2011.

* cited by examiner

AUGMENTING A REAL-TIME COLLABORATION WITH RANKED ELECTRONIC BULLETIN BOARD POSTS

This application is a continuation application claiming priority to Ser. No. 13/305,819 filed Nov. 29, 2011, now U.S. Pat. No. 8,812,527, issued Aug. 19, 2014.

TECHNICAL FIELD

The present invention generally relates to managing a synchronous collaboration, and more specifically to supplementing a chat session

BACKGROUND

A large-scale, Internet-based or intranet-based threaded discussion forum (a.k.a. Jam) for facilitating innovation through enterprise-wide brainstorming, connects a large population (e.g., tens of thousands) of individuals across boundaries and jobs to develop actionable ideas around business-critical or urgent societal issues. Jams may be a central element in a management system and may facilitate a transformation of a company into a values-based organization. For example, International Business Machines Corporation has hosted an Innovation Jam® collaboration for products and services it develops, consults, and delivers for an external or an internal customer. A Jam may include the following components and methods:

- A high-profile online event that has a specific duration.
- A defined agenda, focused on strategic and critical enterprise issues.
- A real-time discussion database that includes ideas, best practices and personnel sentiment.
- Real-time text mining and analysis to identify and direct live discussion trends.

BRIEF SUMMARY

An embodiment of the present invention is a system, method and program product for augmenting a real-time collaboration. A computer receives a content of the real-time collaboration. The computer determines a key word which is included in the content of the real-time collaboration. The computer determines a match between the key word which is included in the content of the real-time collaboration and a theme of one or more posts in a threaded discussion forum. Based on the match between the key word which is included in the content of the real-time collaboration and the theme of the one or more posts in the threaded discussion forum, the computer initiates display, on a monitor used for the real-time collaboration, of one or more links to the one or more posts.

Another embodiment of the present invention is a system, method and program product for augmenting a real-time collaboration. A computer receives a content of the real-time collaboration. The computer determines a first theme of the content of the real-time collaboration. The computer determines a match between the first theme of the content of the real-time collaboration and a second theme of one or more posts in a threaded discussion forum. Based on the match between the first theme of the content of the real-time collaboration and the second theme of the one or more posts in the threaded discussion forum, the computer initiates display, on a monitor used for the real-time collaboration, of one or more links to the one or more posts.

Embodiments of the present invention recommend discussion threads based on textual analysis of real-time collaborations between individuals or among groups. Participants in an ongoing real-time collaboration can easily identify discussion thread posts that are related to topics being discussed in the real-time collaboration, thereby assisting the participants in viewing the related posts and making contributions to the discussion threads and/or the real-time collaboration. Further, embodiments of the present invention perform a thematic analysis of a chat session and compare the results of the thematic analysis to a thematic analysis of a corpus of threaded discussions to present threaded discussion posts to participants of the chat session during the chat session, where the theme of the threaded discussion posts matches the theme of the chat session.

DETAILED DESCRIPTION

Overview

Embodiments of the present invention correlate theme(s) of subject matter of an asynchronous collaboration to content of a real-time collaboration and presents links (a.k.a. hyperlinks) to the thematically correlated subject matter, thereby allowing one or more participants in the real-time collaboration to select one or more of the links, and access and contribute to topics of interest in the asynchronous collaboration.

Embodiments of the present invention exploit real-time and periodic analysis of textual data to discover relationships between a real-time collaboration and one or more asynchronous collaborations. A real-time collaboration utilizes computer-mediated communication between participants of the collaboration to create a real-time dialog between the participants. Typically, a real-time collaboration lasts between a minute and a few hours. A real-time collaboration may be an online chat session. Although embodiments may be described herein involving an online chat session, the present invention contemplates other embodiments that replace the chat session with another real-time collaboration.

An asynchronous collaboration also utilizes computer-mediated communication among participants, but the participants are not expected to communicate in real-time, and typically there is considerable delay between posts by the participants. Typically, an asynchronous collaboration lasts from days to months. An asynchronous collaboration may be a threaded discussion forum or an electronic bulletin board. Although embodiments may be described herein involving a threaded discussion forum, the present invention contemplates other embodiments that replace the threaded discussion forum with another asynchronous collaboration.

Figure 1:
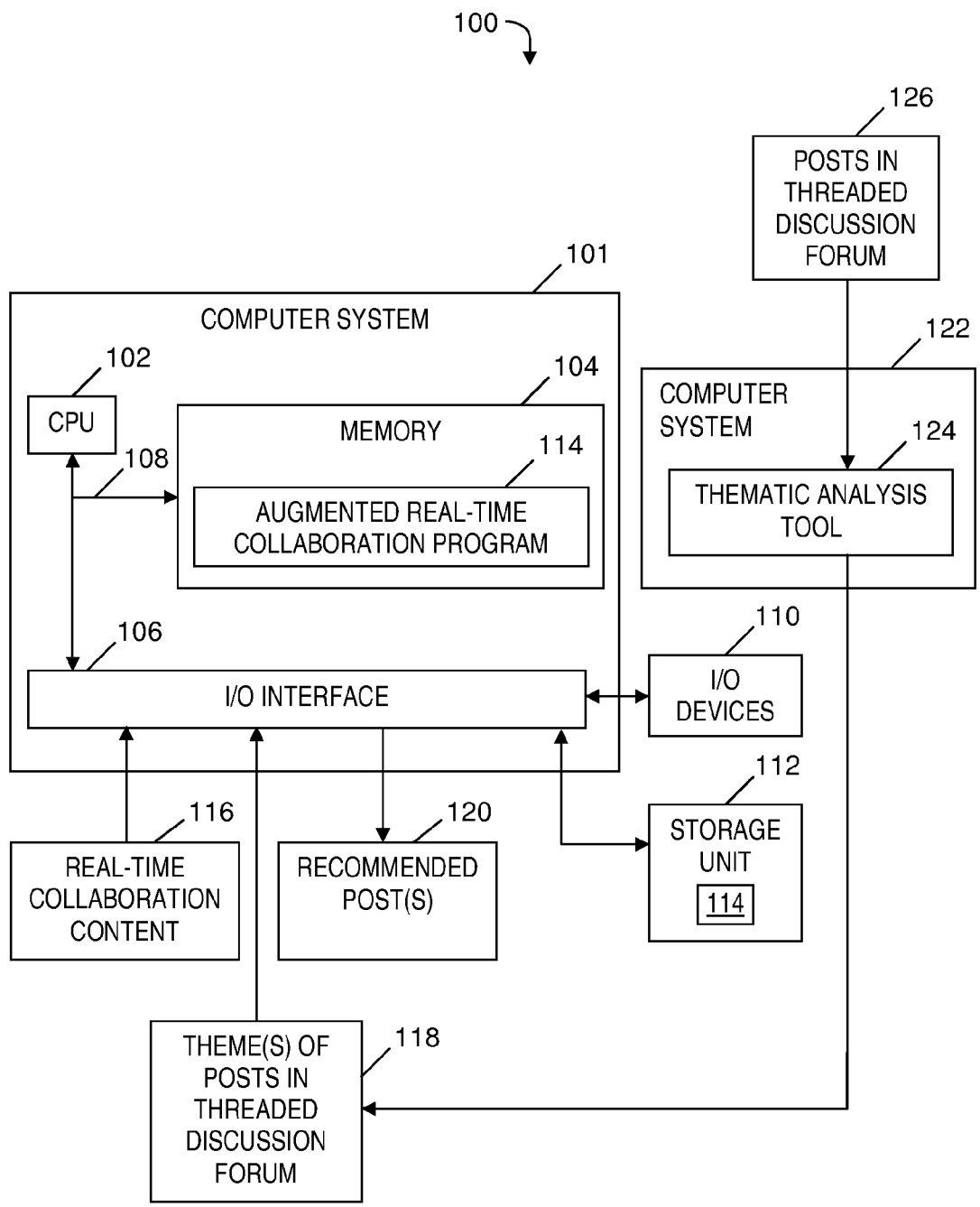
FIG. 1 is a block diagram of a system for recommending threaded discussion forum posts during a real-time collaboration, in accordance with embodiments of the present invention.

System for Recommending Threaded Discussion Posts During a Real-time Collaboration FIG. 1 is a block diagram of a system 100 for recommending threaded discussion forum posts during a real-time collaboration, in accordance with embodiments of the present invention. System 100 includes a computer system 101, which generally comprises a central processing unit (CPU) 102, a memory 104, an input/output (I/O) interface 106, and a bus 108. Further, computer system 101 is coupled to I/O devices 110 and a computer data storage unit 112. CPU 102 executes augmented real-time collaboration program 114 stored in disk storage 112 via memory 104 to recommend threaded discussion forum posts and modify the recommended threaded discussion forum posts during a real-time collaboration. Computer system 101, CPU 102, memory 104, I/O interface 106, bus 108, I/O devices 110, storage unit 112 and augmented real-time collaboration program 114 are further described in the section entitled Computer System presented below.

Via I/O interface 106, augmented real-time collaboration program 114 receives content 116, such as messages entered by participants, included in a real-time collaboration (e.g., chat session) among multiple participants utilizing multiple computer systems and/or computer devices (not shown). The content 116 may be stored on one or more data repositories (not shown). Via I/O interface 106, augmented real-time collaboration program 114 retrieves one or more themes 118 of posts included in one or more threaded discussion forums.

A software-based thematic analysis tool 124 executing on a computer system 122 periodically performs a thematic analysis of posts 126 in the threaded discussion forum(s) to determine the theme(s) 118 of the posts 126. In one embodiment, the thematic analysis of posts 126 in the threaded discussion forum(s) includes the following steps:
1. Identify a dictionary of frequently used terms in a text data set U that includes posts 126.
2. Create a feature space that identifies the dictionary term occurrences in each post of text data set U.
3. Apply a fast decision tree-based rule induction algorithm to the feature space over U to identify rules that classify posts into a category composed of posts from a subset V of U, where the subset V is associated with a theme.
4. Use feature based antecedents of each rule to classify post(s) in posts 126 that are in the subset V.

The aforementioned steps of the thematic analysis are further described in Behal et al., U.S. Patent Application Publication No. 2009/0292660, "Using Rule Induction to Identify Emerging Trends in Unstructured Text Streams," which is hereby incorporated herein by reference, in its entirety.

In one embodiment, augmented real-time collaboration program 114 is included in a tool (not shown) that enhances a single threaded discussion forum provided by system 100 by including the real-time collaboration functionality provided by program 114 in the functionality of the threaded discussion forum. In another embodiment, augmented real-time collaboration program 114 considers posts from one or more threaded discussion forums that support the above-mentioned thematic analysis, or that permits a third party application to perform the above-mentioned thematic analysis. The augmented real-time collaboration program 114 may also select the aforementioned threaded discussion forum(s) from multiple threaded discussion forums by performing one of the following actions:

Select threaded discussion forum(s) for consideration in response to automatically receiving an indication from the threaded discussion forum(s) that the threaded discussion forum(s) are currently being conducted.

Select threaded discussion forum(s) for consideration in response to receiving an indication that the threaded discussion forum(s) are currently being conducted and in response to a participant selecting the threaded discussion forum(s).

Select threaded discussion forum(s) for consideration in response to receiving an indication that the threaded discussion forum(s) are currently being conducted and matching a participant in the real-time collaboration to a registered participant in the threaded discussion forum(s).

Select threaded discussion forum(s) for consideration in response to receiving an indication that the threaded discussion forum(s) are currently being conducted and matching an organization associated with a participant in the real-time collaboration to an organization associated with the threaded discussion forum(s).

Select threaded discussion forum(s) for consideration in response to receiving from a participant of the real-time collaboration an entry that identifies the threaded discussion forum(s).

In one embodiment, the real-time collaboration that includes content 116 is conducted within a time period (e.g., three days) specified as the duration of the threaded discussion forum. The theme(s) 118 may be stored on one or more data repositories (not shown), such as a table included in or coupled to computer system 101. Augmented real-time collaboration program 114 determines key word(s) or theme(s) of the real-time collaboration content 116. Augmented real-time collaboration program 114 may determine theme(s) of the content 116 by performing the same thematic analysis that is used by tool 124 to determine theme(s) of posts 126 in the threaded discussion forum. Augmented real-time collaboration program 114 compares the key word(s) or theme(s) of the real-time collaboration content 116 to the theme(s) 118 of posts included in the threaded discussion forum, and based on the comparison, generates one or more recommended posts 120 that include post(s) from the threaded discussion forum, where theme(s) of the recommended post(s) 120 match the key word(s) or theme(s) of the real-time collaboration content 116.

In one embodiment, the one or more recommended posts 120 are presented to one or more participants of the real-time collaboration, the recommended post(s) 120 have theme(s) related to the content of the real-time collaboration, and the recommended post(s) 120 include post(s) having theme(s) selected from only the set of theme(s) periodically extracted from the threaded discussion forum by tool 124. In another embodiment, the recommended post(s) 120 are presented to participant(s) of the real-time collaboration, the recommended post(s) 120 have theme(s) related to the content of the real-time collaboration, and the recommended post(s) 120 include post(s) included in the threaded discussion forum and message(s) included in the real-time collaboration, where the post(s) have theme(s) periodically extracted from the threaded discussion forum by tool 124 and the message(s) have theme(s) determined by a thematic analysis of the content 116 of the real-time collaboration, where the thematic analysis is performed by augmented real-time collaboration program 114.

In one embodiment, augmented real-time collaboration program 114 compares key word(s) of content 116 to the theme(s) 118 of posts 126 included in the threaded discussion forum by comparing every word typed in the real-time collaboration to the theme(s) discovered using the thematic analysis described above. In one embodiment, augmented real-time collaboration program 114 receives a list of words that will not be matched to themes, thereby preventing both the discovery of incorrect relationships and the discovery of too many relationships. For example, common words such as "a," "the" and "and" are included in the list of words that are excluded from thematic matching. Such words to be excluded may be stored in a searchable collection, so that discovery of the excluded words may occur without undue computations. Furthermore, the list of words to be excluded may automatically change over time. With the list of words excluded, the augmented real-time collaboration program 114 compares the remaining words to the theme(s) 118 of the posts 126 and presents results as links to post(s) in the threaded discussion forum so that a user can view related material. A word whose comparison to the theme(s) 118 of the posts 126 results in a presented link having a conversion rate less than a threshold value or having the lowest conversion rate may cause the word to be excluded from future comparisons by augmented real-time collaboration program 114.

In one embodiment, augmented real-time collaboration program 114 compares theme(s) of content 116 to the theme(s) 118 of posts included in the threaded discussion forum, where the theme(s) of content 116 are the result of augmented real-time collaboration program 114 using the thematic analysis technique described in U.S. Patent Application Publication No. 2009/0292660, supra. The augmented real-time collaboration program 114 may use the aforementioned thematic analysis technique to determine a theme of the real-time collaboration at a current time, or based upon a user-invoked action. Augmented real-time collaboration 114 may exclude a list of words in its determination of theme(s) of content 116 to prevent the determination of too many themes or non-important themes.

In a case in which multiple themes are related to a single real-time collaboration, augmented real-time collaboration program 114 may rank the multiple themes so that program 114 presents to the user the most likely to be useful relationship as the first presented relationship. Augmented real-time collaboration 114 may use ranking systems independently or in combination. Ranking systems include, but are not limited to:

Discussion Thread Visitation History: Threads in which the user has not yet visited may be ranked higher than threads that the user has previously visited. During the duration of a collaboration event using the threaded discussion forum, there may be so many discussion threads that a user may not be able to explore all the threads. Therefore, it may be more important to direct a user to threads that the user has not yet discovered to assist in increasing the user's participation during the collaboration event.

Collaboration Interaction History: Analysis may be performed on previous collaborations to determine which users have collaborated previously. Previous collaborations among a group of users may be an indication of a preference of a user in the group of users to collaborate with other users in the same group in a future discussion. Therefore, threaded discussions in which a user has not participated, while other users who have previously collaborated with the user have participated, are ranked higher than other related threaded discussions. In a system employing collaboration interaction history, discussions with the most co-collaborators or most individual collaborations may rank above other discussions. In one embodiment, the list of previous collaborators in a thread may be displayed to the user along with the standard information describing the discussion thread and the relationship.

Stated Interest Relevance: During registration for the collaboration event, the user may provide the user's interests, or the user's interests may be determined based on the user's organization. Each interest may be manually, or through computable methods, related to a set of themes. Discussions related to the set of themes may be ranked higher than other related discussions.

In one embodiment, another computer system 122 includes components (not shown) analogous to the components of computer system 101. A CPU (not shown) included in computer system 122 carries out, via a memory (not shown) included in computer system 122, instructions included in a tool 124 for performing thematic analysis of posts 126 in the aforementioned threaded discussion forum. Tool 124 receives posts 126 included in the threaded discussion forum, and performs a thematic analysis on the content of the messages included in the received posts 126 to determine one or more theme(s) of the received posts 126. For example, the thematic analysis of the content of the messages included in the received posts is performed by the Corporate Brand and Reputation Analysis (COBRA) system offered by International Business Machines Corporation located in Armonk, N.Y. COBRA leverages advanced and deep text and data analytics techniques to mine collaborations. In one embodiment, tool 124 for performing the thematic analysis of the content of the messages included in the received posts 126 has the following capabilities for determining themes of textual content:

1. Search: the ability to perform searches on unstructured text and metadata to create on-topic stores (i.e., search and store).
2. Snippets Analysis: for a given topic, analyze words or phrases at a sentence level within a document.
3. Clustering and Categorization: the ability to automatically create, edit, visualize and apply taxonomies, using a guided interactive real-time environment where the user can experiment through observation.
4. Statistical Analysis: the ability to find correlations, trends and interesting relationships hidden in the information.
5. Fact Extraction/Links: the ability to link the content of heterogeneous documents together through relationships with terms, phrases, and related or derived metadata including people, places, things and taxonomies.
6. Entity Extraction: automatically pull semantic information from text.

Messages included in posts 126 may be generated by multiple users contributing to the threaded discussion forum by utilizing multiple computer systems and/or computer devices (not shown). Each of the computer systems and/or computer devices used by participants in the real-time collaboration may be included in or may be different from the computer systems and/or computer devices utilized by users contributing to the threaded discussion forum.

In one embodiment, tool 124 repeats the thematic analysis of posts 126 periodically, which allows the thematic analysis to be performed on new posts as new posts are added to the threaded discussion forum. Tool 124 may receive a specific time period (e.g., 30 minutes) and perform the thematic analysis periodically based on the received time period. Computer system 122 may communicate with computer system 101 via a network (not shown) (e.g., the Internet), and the communication may include periodically sending the periodically generated results of the thematic analysis, which includes theme(s) 118.

In one embodiment, augmented real-time collaboration program 114 performs a method (see FIG. 3) of modifying recommended post(s) 120 based on detecting a new theme or new key word(s) in additional content of the real-time collaboration that is added to content 116.

In one embodiment, augmented real-time collaboration program 114 performs a method (see FIG. 4) of modifying recommended post(s) 120 based on conversion rate(s) for selecting one or more of the recommended threaded discussion forum posts.

In an alternate embodiment, tool 124 is included in computer system 101 and system 100 does not require computer system 122.

The functionality of components of system 100 is further described below in the discussions relative to FIG. 2, FIG. 3 and FIG. 4.

Figure 2:
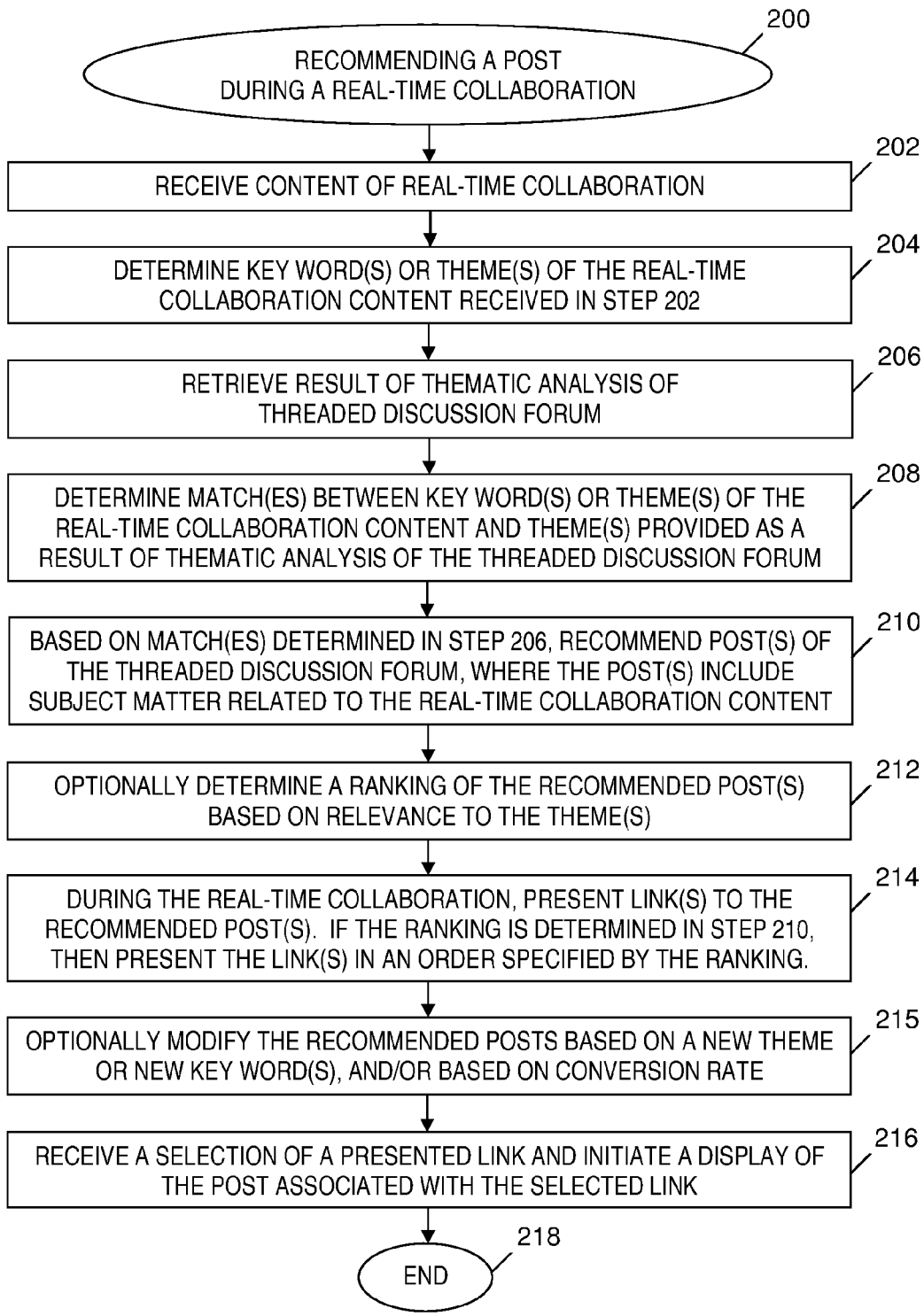
FIG. 2 is a flowchart of an augmented real-time collaboration program 114 (see FIG. 1) executed in computer system 101 (see FIG. 1) for recommending threaded discussion forum posts during a real-time collaboration, in accordance with embodiments of the present invention.

Process for Recommending Threaded Discussion Posts During a Real-time Collaboration FIG. 2 is a flowchart of the augmented real-time collaboration program 114 (see FIG. 1) executed in computer system 101 (see FIG. 1) for recommending threaded discussion forum posts during a real-time collaboration, in accordance with embodiments of the present invention. The process of FIG. 2 starts at step 200. In step 202, augmented real-time collaboration program 114 (see FIG. 1) for recommending threaded discussion posts during a real-time collaboration receives content of a real-time collaboration.

In step 204, augmented real-time collaboration program 114 (see FIG. 1) determines key word(s) included in the real-time collaboration content received in step 202. In another embodiment, in step 204, augmented real-time collaboration program 114 (see FIG. 1) performs a thematic analysis of the real-time collaboration content received in step 202, which results in a determination of one or more themes of the real-time collaboration content. For example, the thematic analysis of the real-time collaboration content is performed by the COBRA system.

In step 206, augmented real-time collaboration program 114 (see FIG. 1) retrieves one or more themes 118 (see FIG. 1) of messages included in posts of a threaded discussion forum, where the retrieved theme(s) are the result of a thematic analysis performed by tool 124 (see FIG. 1). In one embodiment, the thematic analysis is performed periodically at defined time intervals, where the defined time interval is received by tool 124 (see FIG. 1) prior to step 202. Each periodic performance of the thematic analysis may determine additional theme(s) that are added to theme(s) 118 (see FIG. 1), where the additional theme(s) are theme(s) of posts added to the threaded discussion forum in the most recent defined time interval.

In step 208, augmented real-time collaboration program 114 (see FIG. 1) determines match(es) between key word(s) of the real-time collaboration content 116 (see FIG. 1) and the theme(s) 118 (see FIG. 1) that are provided as a result of the thematic analysis of the threaded discussion forum. Again, theme(s) 118 (see FIG. 1) of the posts in the threaded discussion forum are stored in a data repository such as a table included in or coupled to computer system 101 (see FIG. 1). Augmented real-time collaboration program 114 (see FIG. 1) determines synonyms of key words in content 116 (see FIG. 1) by looking up each key word in a lexical database (not shown in FIG. 1) that provides a thesaurus functionality that associates key words to synonyms. The lexical database may be enhanced with additional synonyms provided by one or more human domain experts based on their knowledge of a domain. Augmented real-time collaboration program 114 (see FIG. 1) determines a match between a key word in content 116 (see FIG. 1) and a theme in the table that stores theme(s) 118 (see FIG. 1) by determining the theme is identical to the key word or the theme is identical to one of the synonyms of the key word determined from the look-up in the lexical database.

In another embodiment, in step 208, augmented real-time collaboration program 114 (see FIG. 1) determines match(es) between theme(s) of the real-time collaboration content 116 (see FIG. 1) and the theme(s) 118 (see FIG. 1) provided as a result of the thematic analysis of the threaded discussion forum. Augmented real-time collaboration program 114 (see FIG. 1) may determine a match between a first theme of the real-time collaboration content 116 (see FIG. 1) and a second theme included in theme(s) 118 (see FIG. 1) by determining that the first theme is identical to the second theme. Augmented real-time collaboration program 114 (see FIG. 1) may determine a match between the aforementioned first and second themes by looking up one or more synonyms of the first theme in a lexical database and determining that the second theme is identical to a synonym of the first theme. Augmented real-time collaboration program 114 (see FIG. 1) may determine a match between the aforementioned first and second themes by looking up one or more synonyms of the second theme in a lexical database and determining that the first theme is identical to a synonym of the second theme.

In yet another embodiment, in step 208, augmented real-time collaboration program 114 (see FIG. 1) determines match(es) between theme(s) of content of the real-time collaboration provided in one time period (e.g., a most recent time period) which is included in content 116 (see FIG. 1) and the union of theme(s) 118 (see FIG. 1) provided as a result of the thematic analysis of the threaded discussion forum and theme(s) of content of the real-time collaboration provided in another time period (e.g., a time period preceding the most recent time period).

In step 210, based on the match(es) determined in step 208, augmented real-time collaboration program 114 (see FIG. 1) recommends one or more posts of the threaded discussion forum that include subject matter related to the real-time collaboration content 116 (see FIG. 1). That is, in step 210, augmented real-time collaboration program 114 (see FIG. 1) recommends post(s) whose theme(s) were matched to key word(s) or theme(s) of the real-time collaboration content in step 208.

In another embodiment, in which the match(es) determined in step 208 are based on the union of theme(s) 118 (see FIG. 1) and theme(s) of content of the real-time collaboration, augmented real-time collaboration program 114 (see FIG. 1) determines, in step 210, post(s) of the threaded discussion forum and message(s) previously contributed to the real-time collaboration content 116 (see FIG. 1) based on the aforementioned match(es).

In optional step 212, augmented real-time collaboration program 114 (see FIG. 1) determines a ranking of the recommended posts determined in step 210, where the ranking is based on the relevance of the subject matter of each post to the theme(s) 118 (see FIG. 1). In another embodiment, augmented real-time collaboration program 114 (see FIG. 1) retrieves the ranking of the posts (or posts and messages) recommended in step 210 as part of the results retrieved in step 206, where the ranking was determined by tool 124 (see FIG. 1) prior to step 206.

In step 214, augmented real-time collaboration program 114 (see FIG. 1) presents hyperlink(s) to the recommended post(s) determined in step 210. In one embodiment, the presented hyperlink(s) are permalink(s), where each permalink is a Uniform Resource Locator that points to a respective post in a threaded discussion forum. In one embodiment, augmented real-time collaboration program 114 (see FIG. 1) initiates a display of the hyperlink(s) to the recommended post(s) determined in step 210, where the display of the hyperlink(s) is viewed on a display device by a participant of the real-time collaboration. Augmented real-time collaboration program 114 (see FIG. 1) displays the hyperlink(s) in one portion of a user interface (e.g., right side of user interface 500 in FIG. 5A) that also includes messages entered by participants of the real-time collaboration in another portion of the user interface (e.g., left side of a user interface 500 in FIG. 5A). In one embodiment, the hyperlinks whose display is initiated in step 214 are associated with the posts determined in step 210 in a one-to-one correspondence. In one embodiment, the ranking of the recommended posts is determined in step 212, and step 214 includes the augmented real-time collaboration program 114 (see FIG. 1) presenting the hyperlinks associated with the posts in an ordered list, where the order is specified by the ranking. In one embodiment, the augmented real-time collaboration program 114 (see FIG. 1) displays the hyperlinks in step 214 along with snippets of the messages included the posts that are accessed by selecting the hyperlinks.

In one embodiment, the display of the hyperlink(s) initiated in step 214 is included in the same interface that at least one participant of the real-time collaboration uses to view the content of an ongoing real-time collaboration between the at least one participant and one or more other participants.

Figure 3:
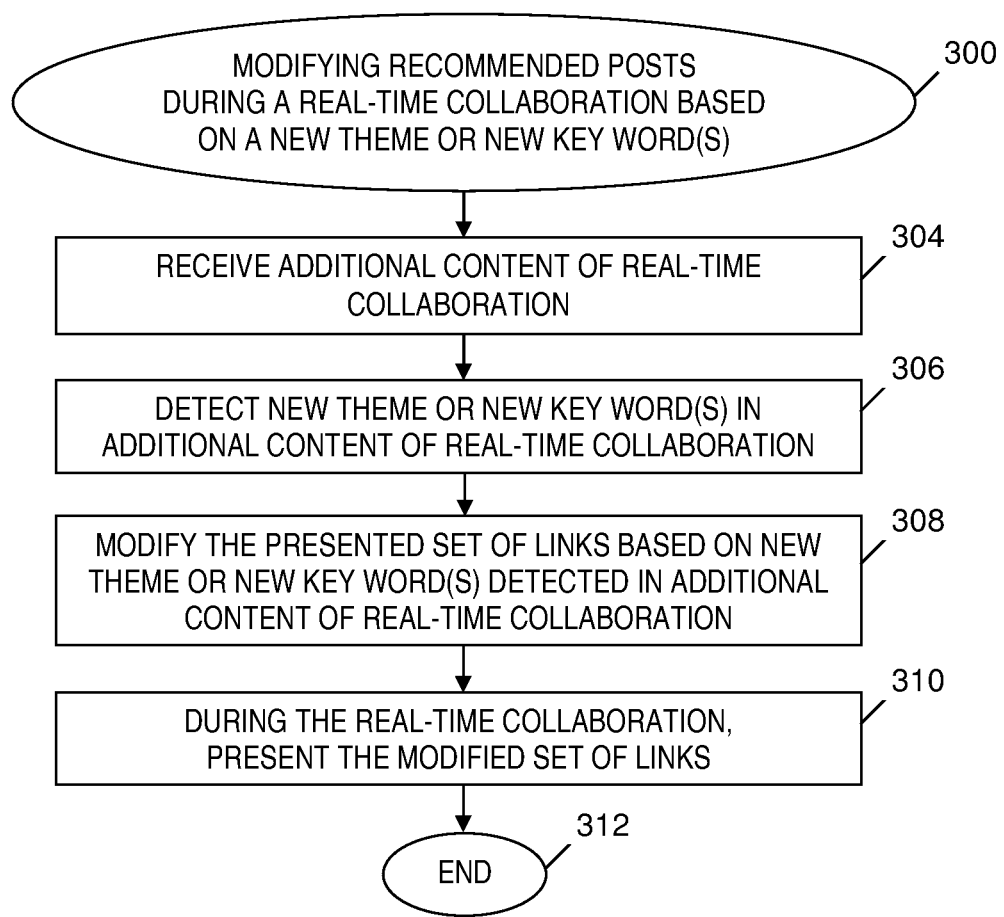
FIG. 3 is flowchart of a portion of augmented real-time collaboration program 114 (see FIG. 1) executed in computer system 101 (see FIG. 1) for modifying recommended threaded discussion forum posts during a real-time collaboration based on a new theme or new keyword(s), in accordance with embodiments of the present invention.
Figure 4:
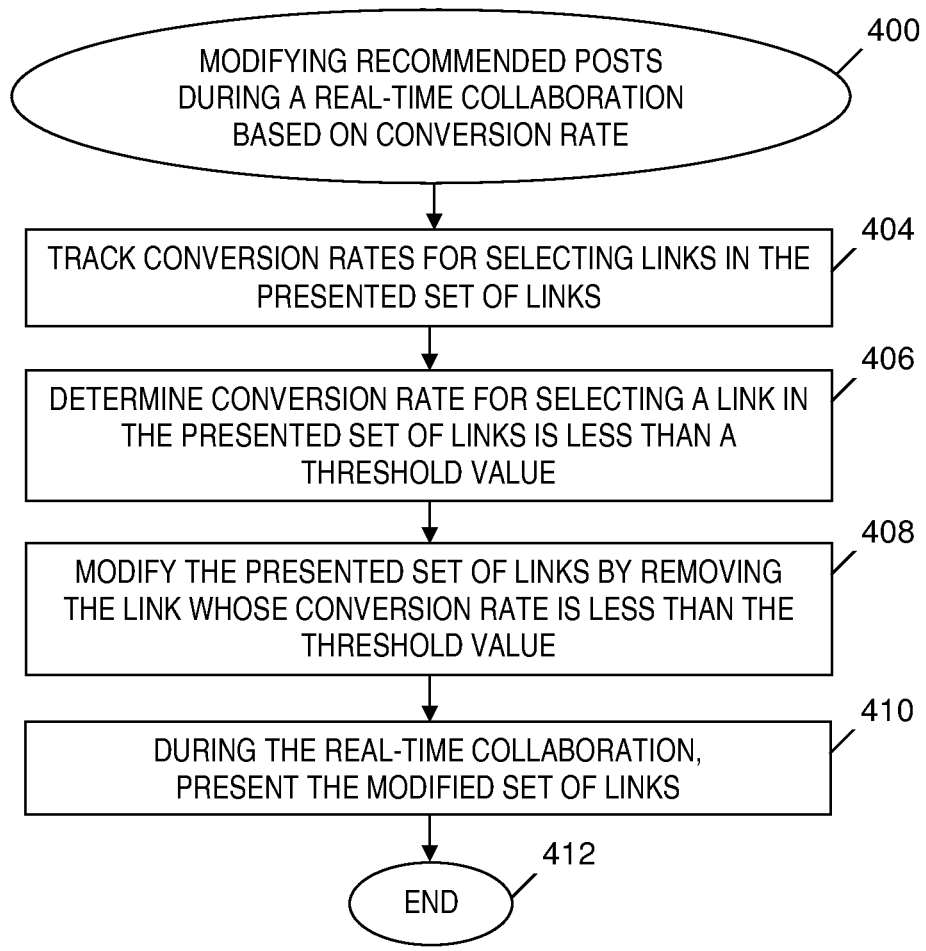
FIG. 4 is a flowchart of a portion of augmented real-time collaboration program 114 (see FIG. 1) executed in computer system 101 (see FIG. 1) for modifying recommended threaded discussion forum posts during a real-time collaboration based on a conversion rate, in accordance with embodiments of the present invention.

In step 215, augmented real-time collaboration program 114 (see FIG. 1) optionally modifies the recommended post(s) based on a new theme or new key word(s) in additional content of the real-time collaboration (see FIG. 3) and/or based on a conversion rate for selecting hyperlink(s) presented in step 214 (see FIG. 4).

In step 216, augmented real-time collaboration program 114 (see FIG. 1) receives a selection of a hyperlink of the hyperlink(s) presented in step 214, step 310 (see FIG. 3) or step 410 (see FIG. 4). In response to receiving the selection of the hyperlink, augmented real-time collaboration program 114 (see FIG. 1) initiates a display of the message included in the post associated with the selected hyperlink. Other information included in the post, such as the author of the message and the date of the post, may also be displayed along with the message in response to receiving the selection of the hyperlink.

In one embodiment, the message whose display is initiated in step 216 is a message contributed to the threaded discussion forum. In another embodiment, the message whose display is initiated in step 216 is a message contributed to the threaded discussion forum or a message included in a transcript of the real-time collaboration.

Following step 216, the process of FIG. 2 ends at step 218.

In one embodiment, steps 202 through 216 are performed while the real-time collaboration and the threaded discussion forum are ongoing.

Processes for Modifying Recommended Posts During a Real-time Collaboration

FIG. 3 is flowchart of step 215 of the augmented real-time collaboration program 114 (see FIG. 1) executed in computer system 101 (see FIG. 1) for modifying recommended threaded discussion forum posts during a real-time collaboration based on a new theme or new keyword(s), in accordance with embodiments of the present invention. The process of FIG. 3 begins at step 300.

In step 304, augmented real-time collaboration program 114 (see FIG. 1) receives additional content of the real-time collaboration, which includes content of messages of the real-time collaboration that were sent by participants of the collaboration after step 214 (see FIG. 2) was performed. Augmented real-time collaboration program 114 (see FIG. 1) modifies real-time collaboration content 116 (see FIG. 1) by adding the aforementioned additional content.

In step 306, augmented real-time collaboration program 114 (see FIG. 1) detects one or more new key words in the additional content of the real-time collaboration. In another embodiment, augmented real-time collaboration program 114 (see FIG. 1) detects a new theme of the additional content of the real-time collaboration.

In step 308, augmented real-time collaboration program 114 (see FIG. 1) modifies the set of links presented in step 214 (see FIG. 2) based on the new key word(s) detected in step 306. Augmented real-time collaboration program 114 (see FIG. 1) determines match(es) between the new key word(s) detected in step 306 and the theme(s) resulting from the latest thematic analysis of the threaded discussion forum performed by tool 124 (see FIG. 1). Augmented real-time collaboration program 114 (see FIG. 1) determines the aforementioned match(es) in step 308 in the same way program 114 (see FIG. 1) determines a match between a key word in the real-time collaboration and a theme of the threaded discussion forum in step 208 (see FIG. 2). Based on the match(es) determined in step 308, augmented real-time collaboration program 114 (see FIG. 1) determines post(s) of the threaded discussion forum that are related to the additional content of the real-time collaboration. Subsequently, augmented real-time collaboration program 114 (see FIG. 1) modifies the set of links presented in step 214 (see FIG. 2) by adding the post(s) determined based on the match(es) between the new key word(s) detected in step 306 and the theme(s) resulting from the latest thematic analysis of the threaded discussion forum.

In another embodiment, in step 308, augmented real-time collaboration program 114 (see FIG. 1) modifies the set of links presented in step 214 (see FIG. 2) based on the new theme detected in step 306. Augmented real-time collaboration program 114 (see FIG. 1) determines a match between the new theme detected in step 306 and a theme resulting from the latest thematic analysis of the threaded discussion forum performed by tool 124 (see FIG. 1). Augmented real-time collaboration program 114 (see FIG. 1) determines the aforementioned match in step 308 between the new theme detected in step 306 and the theme of the threaded discussion forum in the same way program 114 (see FIG. 1) determines a match between a theme of the real-time collaboration and a theme of the threaded discussion forum in step 208 (see FIG. 2). Based on the match between the theme of the real-time collaboration and the theme of the threaded discussion forum, augmented real-time collaboration program 114 (see FIG. 1) determines post(s) of the threaded discussion forum that are related to the additional content of the real-time collaboration. Subsequently, augmented real-time collaboration program 114 (see FIG. 1) modifies the set of links presented in step 214 (see FIG. 2) by adding the post(s) determined based on the match between the new theme detected in step 306 and a theme resulting from the latest thematic analysis of the threaded discussion forum.

In step 310, augmented real-time collaboration program 114 (see FIG. 1) presents the modified set of links during the real-time collaboration. In one embodiment, in step 310, augmented real-time collaboration program 114 (see FIG. 1) initiates a display of the modified set of links on a display device so that a participant of the real-time collaboration can view messages included in the real-time collaboration and the modified set of links. The augmented real-time collaboration program 114 (see FIG. 1) displays the modified set of links in one portion of a user interface and also displays messages included in the real-time collaboration in another portion of the same user interface. Following step 310, the process of FIG. 3 ends at step 312.

In one embodiment, steps 304 through 310 are performed during the real-time collaboration and during the threaded discussion forum.

FIG. 4 is a flowchart of step 215 (see FIG. 2) of augmented real-time collaboration program 114 (see FIG. 1) executed in computer system 101 (see FIG. 1) for modifying recommended threaded discussion forum posts during a real-time collaboration based on a conversion rate, in accordance with embodiments of the present invention. The process of FIG. 4 starts at step 400.

In step 404, augmented real-time collaboration program 114 (see FIG. 1) tracks conversion rates for one or more participants of the real-time collaboration selecting the links in the set of links presented in step 214 (see FIG. 2). As used herein, a conversion rate for selecting a link is defined as the ratio of the number of times participants of the real-time collaboration click on the link to the number of times the link is displayed to the participants of the real-time collaboration.

In step 406, augmented real-time collaboration program 114 (see FIG. 1) determines that a conversion rate included in the conversion rates tracked in step 404 is less than a threshold value, or otherwise fails to satisfy a predefined condition. In one embodiment, augmented real-time collaboration program 114 (see FIG. 1) receives the threshold value prior to step 214 (see FIG. 2).

In step 408, augmented real-time collaboration program 114 (see FIG. 1) modifies the set of links previously presented in step 214 (see FIG. 2) by removing the link whose conversion rate was determined in step 406 to be less than the threshold value (or was determined in step 406 to not satisfy the aforementioned predefined condition).

In step 410, augmented real-time collaboration program 114 (see FIG. 1) presents the set of links modified in step 408 during the real-time collaboration. In one embodiment, in step 410, augmented real-time collaboration program 114 (see FIG. 1) initiates a display of the modified set of links on a display device so that a participant of the real-time collaboration can view messages included in the collaboration and the modified set of links. Following step 410, the process of FIG. 4 ends at step 412.

EXAMPLES

Figure 5A:
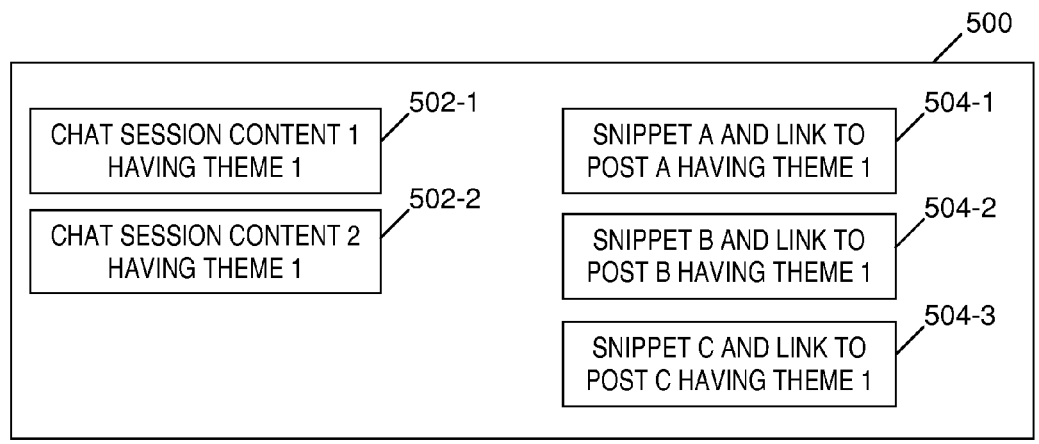
FIG. 5A is an example of an interface that includes a chat session and links to related posts presented by the program of FIG. 2, in accordance with embodiments of the present invention.

FIG. 5A is an example of an interface that includes a chat session and links to related posts presented by the program of FIG. 2, in accordance with embodiments of the present invention. Example interface 500 includes a first portion (e.g., left side of the interface) that includes content of a chat session which includes chat session content 502-1 and chat session content 502-2. Content 502-1 and content 502-2 have the same theme (i.e., Theme 1) and are received by augmented real-time collaboration program 114 (see FIG. 1) in step 202 (see FIG. 2). The theme of the chat session content is the result of a thematic analysis performed on the chat session content by augmented real-time collaboration program 114 (see FIG. 1) in step 204 (see FIG. 2).

Example interface 500 includes a second portion (e.g., right side of the interface) that includes an ordered list of hyperlinks and snippets of the messages included in the posts that are accessed by selecting the hyperlinks. Snippet A and hyperlink to Post A 504-1 is listed first in the ordered list. Snippet B and link to Post B 504-2 is listed second in the ordered list. Snippet C and link to Post C 504-3 is listed third in the ordered list. The posts associated with the listed hyperlinks each have the same theme (i.e., Theme 1), which is also the theme of content 502-1 and content 502-2. The theme of the posts associated with the hyperlinks included in the ordered list is the result of a thematic analysis performed by tool 124 (see FIG. 1) on a threaded discussion forum that includes the posts.

The hyperlinks included in the list in example interface 500 were selected based on augmented real-time collaboration program 114 (see FIG. 1) determining a match between the theme of the content of the chat session (i.e., content 502-1 and 502-2) and the theme of the aforementioned posts, which were selected from a plurality of posts included in the threaded discussion forum (see steps 208 and 210 in FIG. 2). The list of hyperlinks 504-1, 504-2, 504-3 in interface 500 is ordered according to a ranking determined by augmented real-time collaboration program 114 (see FIG. 1) in step 212 (see FIG. 2). Augmented real-time collaboration program 114 (see FIG. 1) presents the ordered list of hyperlinks 504-1, 504-2, 504-3 to participants of the real-time collaboration in step 214 (see FIG. 2). The presentation of the hyperlinks in 504-1, 504-2 and 504-3 allows a participant of the chat session to select one of the hyperlinks, view the associated post from the threaded discussion forum that includes subject matter related to the content of the chat session, and contribute one or more other posts to the threaded discussion forum based on the content of the chat session.

Figure 5B:
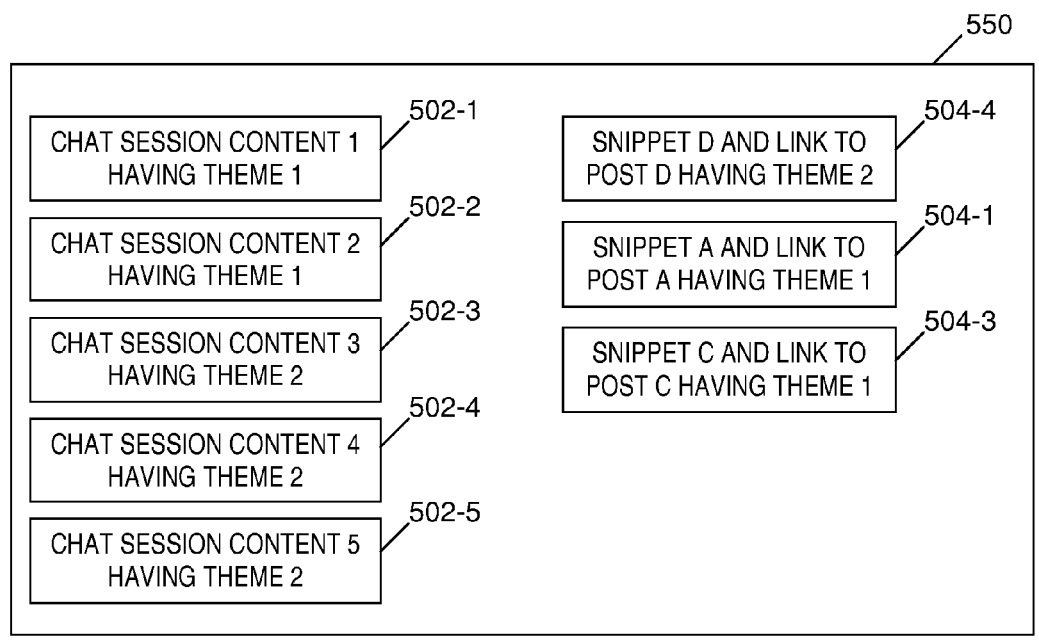
FIG. 5B is an exemplary interface that includes the chat session of FIG. 5A together with additional chat session content that has a new theme and that further includes a modification of the links to related posts of FIG. 5A, where the links are modified by the program portions of FIG. 3 and FIG. 4, in accordance with embodiments of the present invention.

FIG. 5B is an exemplary interface that includes the chat session of FIG. 5A together with additional chat session content that has a new theme and that further includes a modification of the links to related posts of FIG. 5A, where the links are modified by the program portions of FIG. 3 and FIG. 4, in accordance with embodiments of the present invention. Example interface 550 includes a first portion (e.g., left side of the interface) that includes content of a chat session which includes chat session content 502-1 and 502-2 having a theme of Theme 1, as determined by augmented real-time collaboration program 114 (see FIG. 1) (see the discussion of FIG. 5A above). The first portion of interface 550 also includes additional chat session content 502-3, 502-4 and 502-5.

The additional chat session content is received by augmented real-time collaboration program 114 (see FIG. 1) in step 304 (see FIG. 3) after the presentation of the set of hyperlinks shown in FIG. 5A (see step 214 in FIG. 2). Augmented real-time collaboration program 114 (see FIG. 1) detects a new theme (i.e., Theme 2) of the additional chat session content (see step 306 in FIG. 3). The new theme of the additional chat session content is the result of a thematic analysis performed on the additional chat session content by augmented real-time collaboration program 114 (see FIG. 1) in step 306 (see FIG. 3). Augmented real-time collaboration program 114 (see FIG. 1) modifies the ordered list of hyperlinks shown in FIG. 5A in step 308 (see FIG. 3) so that Snippet D and hyperlink to post D 504-4 having a theme of Theme 2 is added to the list of hyperlinks.

Furthermore, after the presentation of the set of hyperlinks in step 214 (see FIG. 2), the conversion rate for the hyperlinks shown in FIG. 5A is tracked by augmented real-time collaboration program 114 (see FIG. 1) (see step 404 in FIG. 4). In step 406 (see FIG. 4), augmented real-time collaboration program 114 (see FIG. 1) determines that the conversion rate for Post B listed in FIG. 5A is less than a threshold value that had been received by augmented real-time collaboration program 114 (see FIG. 1) prior to step 404 (see FIG. 4). Augmented real-time collaboration program 114 (see FIG. 1) modifies the set of links presented in 214 (see FIG. 2) by removing Snippet B and the hyperlink to Post B 504-2 (see step 408 in FIG. 4) because the conversion rate for Post B was determined to be less than the threshold value. Augmented real-time collaboration program 114 (see FIG. 1) ranks the list of snippets and hyperlinks and the resulting ordered list of snippets and hyperlinks include Snippet D and the hyperlink to Post D 504-4, followed by Snippet A and hyperlink to Post A 504-1, which is followed by Snippet C and hyperlink to Post C 504-3.

Alternately, the steps of FIG. 4 that result in the removal of Snippet B and the hyperlink to Post B 504-2 could be performed before or during the same time period in which the steps of FIG. 3 are performed that results in the addition of Snippet D and hyperlink to Post D 504-4.

Augmented real-time collaboration program 114 (see FIG. 1) presents the set of links modified by step 308 (see FIG. 3) and step 408 (see FIG. 4) during the ongoing real-time collaboration (see step 310 in FIG. 3 and step 410 in FIG. 4).

The hyperlinks 504-1 and 504-3 included in the list in example interface 550 were selected based on augmented real-time collaboration program 114 (see FIG. 1) determining a match between Theme 1 of chat session content 502-1 and 502-2 and Theme 1 of Post A and Post C. Furthermore, the hyperlink 504-4 included in the list in example interface 550 was selected based on augmented real-time collaboration program 114 (see FIG. 1) determining a match between Theme 2 of chat session content 502-3, 502-4 and 502-5 and Theme 2 of Post D. The matching posts were selected from a plurality of posts included in the threaded discussion forum (see steps 208 and 210 in FIG. 2). The list of hyperlinks in interface 550 is ordered according to a ranking determined in step 212 (see FIG. 2) and is presented to participants of the real-time collaboration by step 214 (see FIG. 2). The presentation of the hyperlinks in 504-4, 504-1 and 504-3 allows a participant of the chat session to select one of the hyperlinks, view the associated post from the threaded discussion forum that includes subject matter related to the content of the chat session, and contribute one or more other posts to the threaded discussion forum based on the content of the chat session.

Computer System

In one embodiment, computer system 101 in FIG. 1 implements the processes of FIG. 2, FIG. 3 and FIG. 4. Computer system 101 generally comprises a central processing unit (CPU) 102, a memory 104, an input/output (I/O) interface 106, and a bus 108. Further, computer system 101 is coupled to I/O devices 110 and a computer data storage unit 112. CPU 102 performs computation and control functions of computer system 101, including carrying out instructions included in augmented real-time collaboration program 114 (a.k.a. program code 114) to perform a method of recommending threaded discussion forum posts during a real-time collaboration, where the instructions are carried out by CPU 102 via memory 104. In one embodiment, the CPU 102 carries out instructions included in program code 114 to perform a method of modifying recommended threaded discussion forum posts during a real-time collaboration. CPU 102 may comprise a single processing unit, or be distributed across one or more processing units in one or more locations (e.g., on a client and server).

Memory 104 may comprise any known computer-readable storage medium, which is described below. In one embodiment, cache memory elements of memory 104 provide temporary storage of at least some program code (e.g., program code 114) in order to reduce the number of times code must be retrieved from bulk storage while instructions of the program code are carried out. Moreover, similar to CPU 102, memory 104 may reside at a single physical location, comprising one or more types of data storage, or be distributed across a plurality of physical systems in various forms. Further, memory 104 can include data distributed across, for example, a local area network (LAN) or a wide area network (WAN).

I/O interface 106 comprises any system for exchanging information to or from an external source. I/O devices 110 comprise any known type of external device, including a display device (e.g., monitor), keyboard, mouse, printer, speakers, handheld device, facsimile, etc. Bus 108 provides a communication link between each of the components in computer system 101, and may comprise any type of transmission link, including electrical, optical, wireless, etc.

I/O interface 106 also allows computer system 101 to store information (e.g., data or program instructions such as program code 114) on and retrieve the information from computer data storage unit 112 or another computer data storage unit (not shown). Computer data storage unit 112 may comprise any known computer-readable storage medium, which is described below. For example, computer data storage unit 112 may be a non-volatile data storage device, such as a magnetic disk drive (i.e., hard disk drive) or an optical disc drive (e.g., a CD-ROM drive which receives a CD-ROM disk).

Memory 104 and/or storage unit 112 may store computer program code 114 that includes instructions that are carried out by CPU 102 via memory 104 to suggest threaded discussion forum posts during a real-time collaboration. In one embodiment, memory 104 and/or storage unit 112 stores program code 114 that includes instructions that are carried out by CPU 102 via memory 104 to modify recommended threaded discussion forum posts during a real-time collaboration. Although FIG. 1 depicts memory 104 as including program code 114, the present invention contemplates embodiments in which memory 104 does not include all of code 114 simultaneously, but instead at one time includes only a portion of code 114.

Further, memory 104 may include other systems not shown in FIG. 1, such as an operating system (e.g., Linux®) that runs on CPU 102 and provides control of various components within and/or connected to computer system 101.

Storage unit 112 and/or one or more other computer data storage units (not shown) that are coupled to computer system 101 may store real-time collaboration content 116, theme(s) 118 of posts in a threaded discussion forum, and/or recommended post(s) 120.

As will be appreciated by one skilled in the art, the present invention may be embodied as a system, method or computer program product. Accordingly, an aspect of an embodiment of the present invention may take the form of an entirely hardware aspect, an entirely software aspect (including firmware, resident software, micro-code, etc.) or an aspect combining software and hardware aspects that may all generally be referred to herein as a "module". Furthermore, an embodiment of the present invention may take the form of a computer program product embodied in one or more computer-readable medium(s) (e.g., memory 104 and/or computer data storage unit 112) having computer-readable program code (e.g., program code 114) embodied or stored thereon.

Any combination of one or more computer-readable mediums (e.g., memory 104 and computer data storage unit 112) may be utilized. In one embodiment, the computer-readable storage medium is a computer-readable storage device or computer-readable storage apparatus. A computer-readable storage medium may be, for example, but not limited to, an electronic, magnetic, optical, electromagnetic, infrared or semiconductor system, apparatus, device or any suitable combination of the foregoing. A non-exhaustive list of more specific examples of the computer-readable storage medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be a tangible medium that can contain or store a program (e.g., program 114) for use by or in connection with a system, apparatus, or device for carrying out instructions. The term "computer-readable storage device" does not include a signal propagation medium such as a copper cable, optical fiber or a wireless transmission medium.

Program code (e.g., program code 114) may be transmitted using any appropriate medium, including but not limited to wireless, wireline, optical fiber cable, RF, etc., or any suitable combination of the foregoing.

Computer program code (e.g., program code 114) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Java and all Java-based trademarks and logos are trademarks or registered trademarks of Oracle and/or its affiliates. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 101 or another computer system (not shown) having components analogous to the components of computer system 101 included in FIG. 1. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIG. 2, FIG. 3 and FIG. 4) and/or block diagrams of methods, apparatus (systems) (e.g., FIG. 1), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 114). These computer program instructions may be provided to one or more hardware processors (e.g., CPU 102) of a general purpose computer, special purpose computer, or other programmable data processing apparatus to produce a machine, such that the instructions, which are carried out via the processor(s) of the computer or other programmable data processing apparatus, create means for implementing the functions/acts specified in the flowchart and/or block diagram block or blocks.

These computer program instructions may also be stored in a computer-readable medium (e.g., memory 104 or computer data storage unit 112) that can direct a computer (e.g., computer system 101), other programmable data processing apparatus, or other devices to function in a particular manner, such that the instructions (e.g., program 114) stored in the computer-readable medium produce an article of manufacture including instructions which implement the function/act specified in the flowchart and/or block diagram block or blocks.

The computer program instructions may also be loaded onto a computer (e.g., computer system 101), other programmable data processing apparatus, or other devices to cause a series of operational steps to be performed on the computer, other programmable apparatus, or other devices to produce a computer implemented process such that the instructions (e.g., program 114) which are carried out on the computer, other programmable apparatus, or other devices provide processes for implementing the functions/acts specified in the flowchart and/or block diagram block or blocks.

The flowcharts in FIG. 2, FIG. 3 and FIG. 4 and the block diagram in FIG. 1 illustrate the architecture, functionality, and operation of possible implementations of systems, methods, and computer program products according to various embodiments of the present invention. In this regard, each block in the flowchart or block diagrams may represent a module, segment, or portion of code (e.g., program code 114), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method of augmenting a current instant message session comprising a real-time, text dialog among a plurality of participants, the plurality of participants having respective computing devices displaying respective windows containing the text dialog of the current instant message session, the method comprising the steps of:
   a computer determining that a first post included in a first discussion thread of a first electronic bulletin board and a second post included in a second discussion thread of the first or a second electronic bulletin board have similar subject matter as the text dialog of the current instant message session based in part on a similarity of key words within the first and second posts and the current instant message session;

the computer determining that the first and second posts are from first and second users, respectively, with whom one of the plurality of participants previously collaborated in the current instant message session or a prior instant message session;

the computer determining that the one participant participated in the second discussion thread but not the first discussion thread; and based at least in part on the first and second posts being from the first and second users with whom the one participant has previously collaborated in an instant message session and the one participant having participated in the second discussion thread but not the first discussion thread, the computer displaying in the window of the computing device of the one participant a first hyperlink to the first post before or above a second hyperlink to the second post to indicate that the first post is ranked higher in relevance to the current instant message session than the second post.

2. The method of claim 1, further comprising the steps of:

the computer determining that the first post and a third post included in a third discussion thread of the first, the second, or a third electronic bulletin board have similar subject matter as the text dialog of the current instant message session based in part on a similarity of key words within the first and third posts and the current instant message session;

the computer determining the third post is from a third user with whom the one participant previously collaborated in the current instant message session, the prior instant message session, or another prior instant message session;

the computer determining that the one participant did not participate in the third discussion thread;

the computer determining the one participant previously collaborated with a first number of users who participated in the first discussion thread and with a second number of users who participated in the third discussion thread;

the computer determining the first number of users with whom the one participant previously collaborated is greater than the second number of users with whom the one participant previously collaborated; and based at least in part on the first and third posts being from the first and third users with whom the one participant previously collaborated in an instant message session, the one participant not having participated in the first and third discussion threads, and the first number of users with whom the one participant previously collaborated being greater than the second number of users with whom the one participant previously collaborated, the computer displaying in the window of the computing device of the one participant the first hyperlink to the first post before or above a third hyperlink to the third post to indicate that the first post is ranked higher in relevance to the current instant message session than the third post.

3. The method of claim 1, further comprising the steps of:

the computer determining that the first post and a third post included in a third discussion thread of the first, the second, or a third electronic bulletin board have similar subject matter as the text dialog of the current instant message session based in part on a similarity of key words within the first and third posts and the current instant message session;

the computer determining the third post is from a third user with whom the one participant previously collaborated in the current instant message session, the prior instant message session, or another prior instant message session;

the computer determining that the one participant did not participate in the third discussion thread;

the computer determining the one participant previously viewed the third discussion thread, but not the first discussion thread; and based at least in part on the first and third posts being from the first and third users with whom the one participant previously collaborated in an instant message session, the one participant not having participated in the first and third discussion threads, and the one participant having previously viewed the third discussion thread, but not the first discussion thread, the computer displaying in the window of the computing device of the one participant the first hyperlink to the first post before or above a third hyperlink to the third post to indicate that the first post is ranked higher in relevance to the current instant message session than the third post.

4. The method of claim 1, further comprising the steps of:

the computer determining that the first post and a third post included in a third discussion thread of the first, the second, or a third electronic bulletin board have similar subject matter as the text dialog of the current instant message session based in part on a similarity of key words within the first and third posts and the current instant message session;

the computer determining the third post is from a third user with whom the one participant previously collaborated in the current instant message session, the prior instant message session, or another prior instant message session;

the computer determining that the one participant did not participate in the third discussion thread;

the computer determining an interest of the one participant from an entry of the interest by the one participant or based on an organization to which the one participant belongs;

the computer determining the first post and the interest have similar subject matter and the third post and the interest do not have similar subject matter; and based at least in part on the first and third posts being from the first and third users with whom the one participant previously collaborated in an instant message session, the one participant not having participated in the first and third discussion threads, the first post and the interest having similar subject matter, and the third post and the interest not having similar subject matter, the computer displaying in the window of the computing device of the one participant the first hyperlink to the first post before or above a third hyperlink to the third post to indicate that the first post is ranked higher in relevance to the current instant message session than the third post.

5. The method of claim 1, wherein the first and second electronic bulletin boards are separate from the current and prior instant message sessions.

6. The method of claim 1, further comprising the steps of:

the computer determining a first theme of the first post by employing a thematic analysis of the first post;

the computer determining a second theme of the second post by employing the thematic analysis of the second post;

the computer determining a third theme of the text dialog of the current instant message session; and the computer determining the first and second themes match the third theme, wherein the step of determining the first and second posts have similar subject matter as the text dialog of the current instant message session is based in part on the first and second themes matching the third theme.

7. A computer program product for augmenting a current instant message session comprising a real-time, text dialog among a plurality of participants, the plurality of participants having respective computing devices displaying respective windows containing the text dialog of the current instant message session, the computer program product comprising:

computer-readable storage device(s); and computer-readable program instructions stored on the computer-readable storage device(s), the computer-readable program instructions when executed by a CPU of a computer:

determine that a first post included in a first discussion thread of a first electronic bulletin board and a second post included in a second discussion thread of the first or a second electronic bulletin board have similar subject matter as the text dialog of the current instant message session based in part on a similarity of key words within the first and second posts and the current instant message session;

determine that the first and second posts are from first and second users, respectively, with whom one of the plurality of participants previously collaborated in the current instant message session or a prior instant message session;

determine that the one participant participated in the second discussion thread but not the first discussion thread; and based at least in part on the first and second posts being from the first and second users with whom the one participant has previously collaborated in an instant message session and the one participant having participated in the second discussion thread but not the first discussion thread, display in the window of the computing device of the one participant a first hyperlink to the first post before or above a second hyperlink to the second post to indicate that the first post is ranked higher in relevance to the current instant message session than the second post.

8. The computer program product of claim 7, further comprising program instructions, stored on the storage device(s), which when executed by the CPU of the computer:

determine that the first post and a third post included in a third discussion thread of the first, the second, or a third electronic bulletin board have similar subject matter as the text dialog of the current instant message session based in part on a similarity of key words within the first and third posts and the current instant message session;

determine the third post is from a third user with whom the one participant previously collaborated in the current instant message session, the prior instant message session, or another prior instant message session;

determine that the one participant did not participate in the third discussion thread;

determine the one participant previously collaborated with a first number of users who participated in the first discussion thread and with a second number of users who participated in the third discussion thread;

determine the first number of users with whom the one participant previously collaborated is greater than the second number of users with whom the one participant previously collaborated; and based at least in part on the first and third posts being from the first and third users with whom the one participant previously collaborated in an instant message session, the one participant not having participated in the first and third discussion threads, and the first number of users with whom the one participant previously collaborated being greater than the second number of users with whom the one participant previously collaborated, display in the window of the computing device of the one participant the first hyperlink to the first post before or above a third hyperlink to the third post to indicate that the first post is ranked higher in relevance to the current instant message session than the third post.

9. The computer program product of claim 7, further comprising program instructions, stored on the storage device(s), which when executed by the CPU of the computer:

determine that the first post and a third post included in a third discussion thread of the first, the second, or a third electronic bulletin board have similar subject matter as the text dialog of the current instant message session based in part on a similarity of key words within the first and third posts and the current instant message session;

determine the third post is from a third user with whom the one participant previously collaborated in the current instant message session, the prior instant message session, or another prior instant message session;

determine that the one participant did not participate in the third discussion thread;

determine the one participant previously viewed the third discussion thread, but not the first discussion thread; and based at least in part on the first and third posts being from the first and third users with whom the one participant previously collaborated in an instant message session, the one participant not having participated in the first and third discussion threads, and the one participant having previously viewed the third discussion thread, but not the first discussion thread, display in the window of the computing device of the one participant the first hyperlink to the first post before or above a third hyperlink to the third post to indicate that the first post is ranked higher in relevance to the current instant message session than the third post.

10. The computer program product of claim 7, further comprising program instructions, stored on the storage device(s), which when executed by the CPU of the computer:

determine that the first post and a third post included in a third discussion thread of the first, the second, or a third electronic bulletin board have similar subject matter as the text dialog of the current instant message session based in part on a similarity of key words within the first and third posts and the current instant message session;

determine the third post is from a third user with whom the one participant previously collaborated in the current instant message session, the prior instant message session, or another prior instant message session;

determine that the one participant did not participate in the third discussion thread;

determine an interest of the one participant from an entry of the interest by the one participant or based on an organization to which the one participant belongs;

determine the first post and the interest have similar subject matter and the third post and the interest do not have similar subject matter; and based at least in part on the first and third posts being from the first and third users with whom the one participant previously collaborated in an instant message session, the one participant not having participated in the first and third discussion threads, the first post and the interest having similar subject matter, and the third post and the interest not having similar subject matter, display in the window of the computing device of the one participant the first hyperlink to the first post before or above a third hyperlink to the third post to indicate that the first post is ranked higher in relevance to the current instant message session than the third post.

11. The computer program product of claim 7, wherein the first and second electronic bulletin boards are separate from the current and prior instant message sessions.

12. The computer program product of claim 7, further comprising program instructions, stored on the storage device(s), which when executed by the CPU of the computer:

determine a first theme of the first post by employing a thematic analysis of the first post;

determine a second theme of the second post by employing the thematic analysis of the second post;

determine a third theme of the text dialog of the current instant message session; and determine the first and second themes match the third theme, wherein the program instructions to determine the first and second posts have similar subject matter as the text dialog of the current instant message session are executed based in part on the first and second themes matching the third theme.

13. A computer system for augmenting a current instant message session comprising a real-time, text dialog among a plurality of participants, the plurality of participants having respective computing devices displaying respective windows containing the text dialog of the current instant message session, the computer system comprising:

one or more processors;
one or more computer-readable memories;
one or more computer-readable storage devices; and
program instructions stored on the one or more storage devices for execution by the one or more processors via the one or more memories, the program instructions comprising:

first program instructions to determine that a first post included in a first discussion thread of a first electronic bulletin board and a second post included in a second discussion thread of the first or a second electronic bulletin board have similar subject matter as the text dialog of the current instant message session based in part on a similarity of key words within the first and second posts and the current instant message session;

second program instructions to determine that the first and second posts are from first and second users, respectively, with whom one of the plurality of participants previously collaborated in the current instant message session or a prior instant message session;

third program instructions to determine that the one participant participated in the second discussion thread but not the first discussion thread; and based at least in part on the first and second posts being from the first and second users with whom the one participant has previously collaborated in an instant message session and the one participant having participated in the second discussion thread but not the first discussion thread, fourth program instructions to display in the window of the computing device of the one participant a first hyperlink to the first post before or above a second hyperlink to the second post to indicate that the first post is ranked higher in relevance to the current instant message session than the second post.

14. The computer system of claim 13, further comprising:

fifth program instructions, stored on the one or more storage devices for execution by the one or more processors via the one or more memories, to determine that the first post and a third post included in a third discussion thread of the first, the second, or a third electronic bulletin board have similar subject matter as the text dialog of the current instant message session based in part on a similarity of key words within the first and third posts and the current instant message session;

sixth program instructions, stored on the one or more storage devices for execution by the one or more processors via the one or more memories, to determine the third post is from a third user with whom the one participant previously collaborated in the current instant message session, the prior instant message session, or another prior instant message session;

the computer determining that the one participant did not participate in the third discussion thread;

seventh program instructions, stored on the one or more storage devices for execution by the one or more processors via the one or more memories, to determine the first post is included in a first discussion among first users and the second post is included in a second discussion among second users;

eighth program instructions, stored on the one or more storage devices for execution by the one or more processors via the one or more memories, to determine the one participant previously collaborated with a first number of users included in the first users;

ninth program instructions, stored on the one or more storage devices for execution by the one or more processors via the one or more memories, to determine the one participant previously collaborated with a second number of other users included in the second users; and tenth program instructions, stored on the one or more storage devices for execution by the one or more processors via the one or more memories, to determine the first number is greater than the second number, based at least in part on the first and third posts being from the first and third users with whom the one participant previously collaborated in an instant message session, the one participant not having participated in the first and third discussion threads, and the first number of users with whom the one participant previously collaborated being greater than the second number of users with whom the one participant previously collaborated, eleventh program instructions, stored on the one or more storage devices for execution by the one or more processors via the one or more memories, to display in the window of the computing device of the one participant the first hyperlink to the first post before or above a third hyperlink to the third post to indicate that the first post is ranked higher in relevance to the current instant message session than the third post.

15. The computer system of claim 13, further comprising:

fifth program instructions, stored on the one or more storage devices for execution by the one or more processors via the one or more memories, to determine that the first post and a third post included in a third discussion thread of the first, the second, or a third electronic bulletin board have similar subject matter as the text dialog of the current instant message session based in part on a similarity of key words within the first and third posts and the current instant message session;

sixth program instructions, stored on the one or more storage devices for execution by the one or more processors via the one or more memories, to determine the third post is from a third user with whom the one participant previously collaborated in the current instant message session, the prior instant message session, or another prior instant message session;

seventh program instructions, stored on the one or more storage devices for execution by the one or more processors via the one or more memories, to determine that the one participant did not participate in the third discussion thread;

eighth program instructions, stored on the one or more storage devices for execution by the one or more processors via the one or more memories, to determine the one participant previously viewed the third discussion thread, but not the first discussion thread; and based at least in part on the first and third posts being from the first and third users with whom the one participant previously collaborated in an instant message session, the one participant not having participated in the first and third discussion threads, and the one participant having previously viewed the third discussion thread, but not the first discussion thread, ninth program instructions, stored on the one or more storage devices for execution by the one or more processors via the one or more memories, to display in the window of the computing device of the one participant the first hyperlink to the first post before or above a third hyperlink to the third post to indicate that the first post is ranked higher in relevance to the current instant message session than the third post.

16. The computer system of claim 13, further comprising:

fifth program instructions, stored on the one or more storage devices for execution by the one or more processors via the one or more memories, to determine that the first post and a third post included in a third discussion thread of the first, the second, or a third electronic bulletin board have similar subject matter as the text dialog of the current instant message session based in part on a similarity of key words within the first and third posts and the current instant message session;

sixth program instructions, stored on the one or more storage devices for execution by the one or more processors via the one or more memories, to determine the third post is from a third user with whom the one participant previously collaborated in the current instant message session, the prior instant message session, or another prior instant message session;

seventh program instructions, stored on the one or more storage devices for execution by the one or more processors via the one or more memories, to determine that the one participant did not participate in the third discussion thread;

eighth program instructions, stored on the one or more storage devices for execution by the one or more processors via the one or more memories, to determine an interest of the one participant from an entry of the interest by the one participant or based on an organization to which the one participant belongs;

ninth program instructions, stored on the one or more storage devices for execution by the one or more processors via the one or more memories, to determine the first post and the interest have similar subject matter and the third post and the interest do not have similar subject matter; and based at least in part on the first and third posts being from the first and third users with whom the one participant previously collaborated in an instant message session, the one participant not having participated in the first and third discussion threads, the first post and the interest having similar subject matter, and the third post and the interest not having similar subject matter, tenth program instructions, stored on the one or more storage devices for execution by the one or more processors via the one or more memories, to display in the window of the computing device of the one participant the first hyperlink to the first post before or above a third hyperlink to the third post to indicate that the first post is ranked higher in relevance to the current instant message session than the third post.

17. The computer system of claim 13, wherein the first and second electronic bulletin boards are separate from the current and prior instant message sessions.

* * * * *